United States Patent
Yoon et al.

(10) Patent No.: US 7,688,023 B2
(45) Date of Patent: Mar. 30, 2010

(54) BATTERY PACK MANAGEMENT METHOD FOR HEV AND EV

(75) Inventors: Yeo Won Yoon, Daejeon (KR); Ju Hyun Kang, Daejeon (KR)

(73) Assignee: LG Chem, Ltd. (KR)

( * ) Notice: Subject to any disclaimer, the term of this patent is extended or adjusted under 35 U.S.C. 154(b) by 622 days.

(21) Appl. No.: 11/409,571

(22) Filed: Apr. 24, 2006

(65) Prior Publication Data

US 2006/0255766 A1    Nov. 16, 2006

(30) Foreign Application Priority Data

Apr. 25, 2005    (KR) .................... 10-2005-0033939

(51) Int. Cl.
*H02J 7/00* (2006.01)
*H02J 7/14* (2006.01)

(52) U.S. Cl. .............. 320/104; 324/426; 324/427; 320/132

(58) Field of Classification Search ........... 320/132, 320/104; 324/426–436
See application file for complete search history.

(56) References Cited

U.S. PATENT DOCUMENTS

| | | | | |
|---|---|---|---|---|
| 5,672,953 | A | * | 9/1997 | Kim .................... 320/163 |
| 6,091,325 | A | * | 7/2000 | Zur et al. .................... 340/455 |
| 6,181,101 | B1 | | 1/2001 | Arai et al. |
| 6,747,457 | B2 | * | 6/2004 | Suzuki .................... 324/433 |

FOREIGN PATENT DOCUMENTS

| | | |
|---|---|---|
| EP | 1 655 166 | 5/2006 |
| FR | 2 518 757 | 6/1983 |
| JP | 2002-267698 | 9/2002 |
| WO | WO 2006115349 A1 * | 11/2006 |

* cited by examiner

*Primary Examiner*—Edward Tso
*Assistant Examiner*—Samuel Berhanu
(74) *Attorney, Agent, or Firm*—Cantor Colburn LLP

(57) ABSTRACT

Disclosed is a battery pack management method for HEV and EV. Power for a control signal is applied to a relay of a battery pack connection circuit through a battery management system (BMS) or vehicle control device. Then, current or voltage from a pre-charge resistor of the battery pack connection circuit is detected. Thereafter, the detected current or voltage is compared with standard correspondence information pre-stored in a memory unit of the BMS to determine whether the detected value is within a normal range of the battery pack. A connection between the battery pack and the power conversion circuit is carried out when the detected value is within the normal range as a result of the determination, otherwise a pre-charge relay of the battery pack connection circuit is turned off and then a driver is provided with a warning signal.

10 Claims, 3 Drawing Sheets

BATTERY PACK MANAGEMENT METHOD FOR HEV AND EV

CROSS-REFERENCE RELATED TO APPLICATIONS

This application claims benefit under 35 U.S.C. §119 from Korean Patent Application No. 2005-0033939, filed on Apr. 25, 2005, the entire contents of which are incorporated herein by reference.

BACKGROUND OF THE INVENTION

1. Field of the Invention

The invention relates to a battery pack management method for HEV and EV, and more particularly to a battery pack management method for HEV and EV capable of properly controlling a battery pack connection circuit provided between a battery pack and a power conversion circuit through a battery management system (BMS) of the battery pack or a vehicle control device so that a smoothing capacitor or related devices of the power conversion circuit can be prevented from being damaged in advance when surge current is applied to the power conversion circuit of a vehicle motor unit from the battery pack in starting the vehicle with a start key, and notifying a driver of a diagnosis result through warning means when over-current flows to a pre-charge resistor of the battery pack connection circuit or a pre-charge relay of the battery pack connection circuit is turned off due to over-current or over-voltage during the driving, thereby contributing to a safety drive of the vehicle.

2. Description of the Prior Art

In general, a vehicle using gasoline, diesel oil or LPG as fuel generates a large quantity of harmful exhaust gas to pollute the atmosphere and to induce the global warming, thereby causing damages to the mankind as well as the global environment. Accordingly, in order to solve the problems, it has been actively conducted researches on a hybrid electric vehicle (HEV) having a little exhaust gas or electric vehicle (EV) having no exhaust gas, in most related industries.

The HEV is driven with a driving motor, which uses electricity supplied from a main battery via a power conversion circuit as a driving source, as well as an internal combustion engine using the gasoline, diesel oil or LPG as the fuel. Further, the HEV is controlled so that the fuel efficiency of the vehicle is improved to the utmost in correspondence with each driving situation.

The driving motor of the HEV is converted into a generation mode from a driving mode though control of a hybrid control unit (HCU) when the vehicle is braked or decelerated. At this time, the main battery is charged case-by-case by the electric energy generated from a generator (or driving motor) under control of a battery management system (BMS) connected to the HCU. The currents applied to the main battery from the generator are different and discontinuous depending on the driving situations of the vehicle.

In the mean time, as shown in FIG. 1, a battery pack connection circuit 1 is provided between the power conversion circuit and the main battery for the driving motor. The battery pack connection circuit 1 applies a charge current to the main battery from the driving motor (or generator) under generation mode and applies a driving current to the driving motor from the main battery under driving mode, so that the vehicle is driven by the electric energy.

To the battery pack connection circuit 1 are respectively connected a HV (−) lead and a HV (+) lead for applying the current to the power conversion circuit from the main battery, in a predetermined pattern. To an input terminal of the HV (+) lead is connected a pre-charge resistor 2 for limiting a surge over-current applied to the power conversion circuit from the main battery when the vehicle is started. In addition, a pre-charge relay 3 for high-voltage and a relay 4 for high-voltage main power supply capable of controlling the over-current are respectively connected between the pre-charge resistor and an output terminal through different routes. In the mean time, the HV (−) lead is provided with a separate relay 4a for main power supply capable of controlling the over-current applied to the driving motor from the main battery.

The relays 4, 4a and the pre-charge relay 3 are respectively provided with condensers connected through a control lead applied with 12V current from the main battery. The respective condensers are capable of turning on/off the corresponding relays 3, 4, 4a under control of the BMS. The current flowing through the output terminal of the battery pack connection circuit is measured by a Hall sensor or transformer provided to the output terminal of the HV (−) lead (see FIGS. 1 and 2).

However, the battery back connection circuit of the conventional HEV or EV is not provided with warning means. Accordingly, even though the over-current flows or the over-voltage is applied to the high-voltage pre-charge resistor of the battery pack connection circuit and the pre-charge relay is under ON state, a driver cannot properly cope with the emergency situation. Further, the over-current flows to the power conversion circuit of the driving motor in the vehicle, thereby causing the smoothing capacitor to be damaged.

SUMMARY OF THE INVENTION

Accordingly, the invention has been made to solve the above problems.

An object of the invention is to prevent a smoothing capacitor or related devices of a power conversion circuit from being damaged in advance with a battery pack connection circuit arranged between a battery pack and the power conversion circuit through a battery management system (BMS) or vehicle control device when surge current is applied to the power conversion circuit of a vehicle motor unit from the battery pack in starting the vehicle with a start key.

Another object of the invention is to notify a driver of a diagnosis result through warning means when over-current flows to a pre-charge resistor of the battery pack connection circuit or a pre-charge relay of the battery pack connection circuit is turned off due to over-current or over-voltage during the driving, thereby contributing to a safety drive of the vehicle.

In order to achieve the above objects, there is provided a battery pack management method for HEV and EV, the method comprising steps of: applying power for a control signal to a relay of a battery pack connection circuit through a battery management system (BMS) or vehicle control device; detecting current or voltage from a pre-charge resistor of the battery pack connection circuit; comparing the detected current or voltage with standard correspondence information pre-stored in a memory unit of the BMS to determine whether the detected value is within a normal range of the battery pack; and carrying out a normal charging operation when the detected value is within the normal range as a result of the determination, otherwise turning off a pre-charge relay of the battery pack connection circuit and then providing a driver with a warning signal through warning means electrically connected to the BMS.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 1:
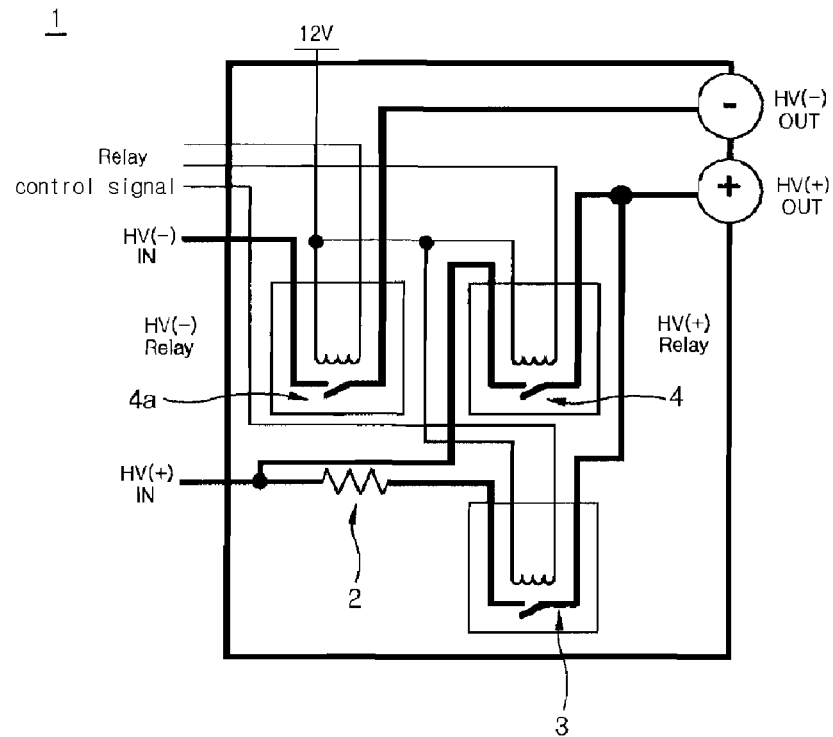
FIG. 1 is a view showing a HV relay control unit typically provided to a battery pack connection circuit of a battery pack.
Figure 2:
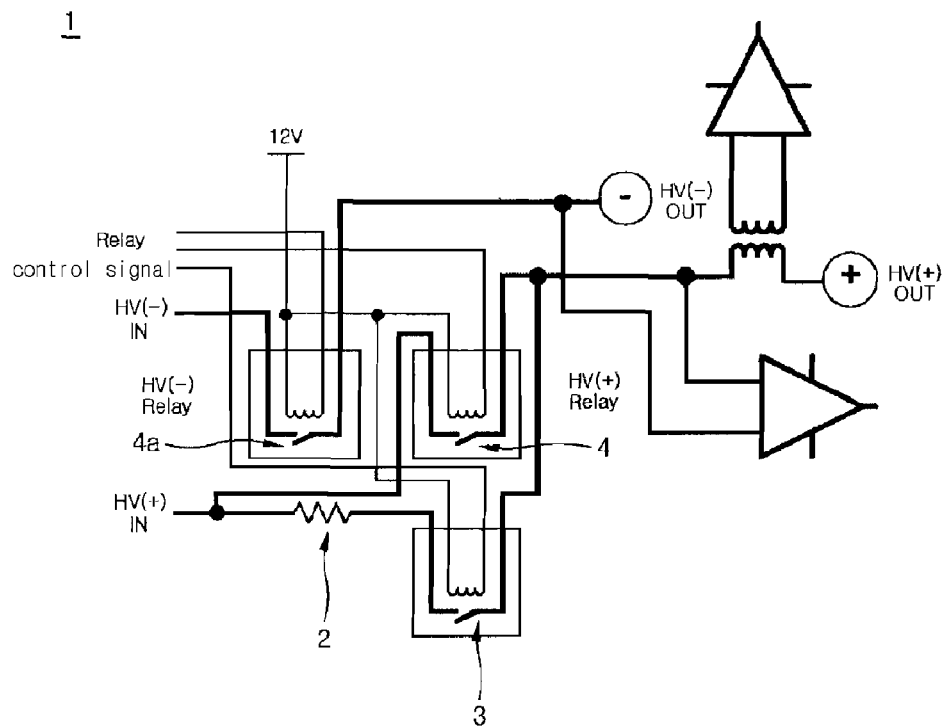
FIG. 2 shows a structure for measuring current and voltage of a battery pack, which is carried out at an output terminal of a HV relay control unit.
Figure 3:
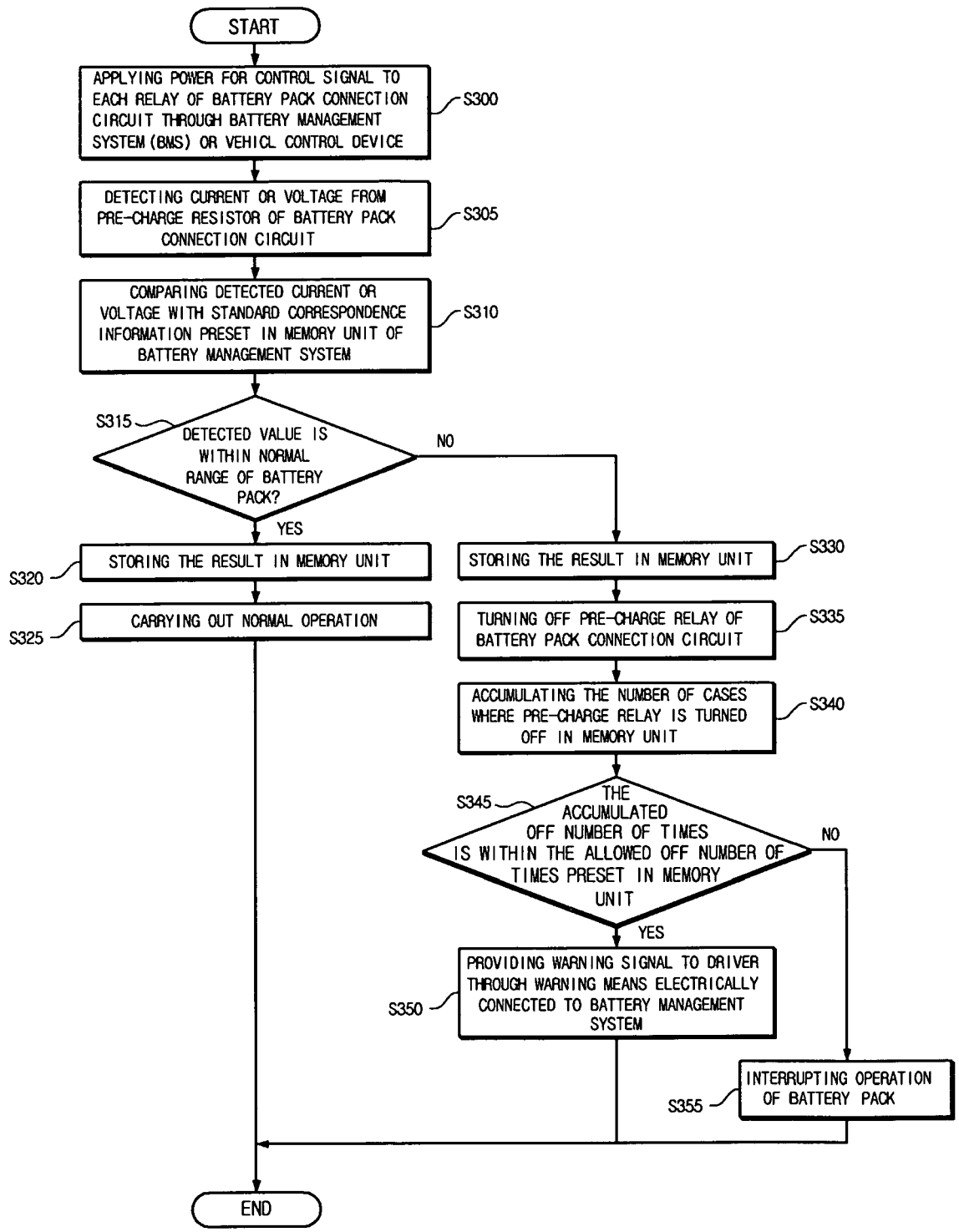
FIG. 3 is a flow chart showing a battery pack management method for HEV and EV according to an embodiment of the invention.
Figure 4:
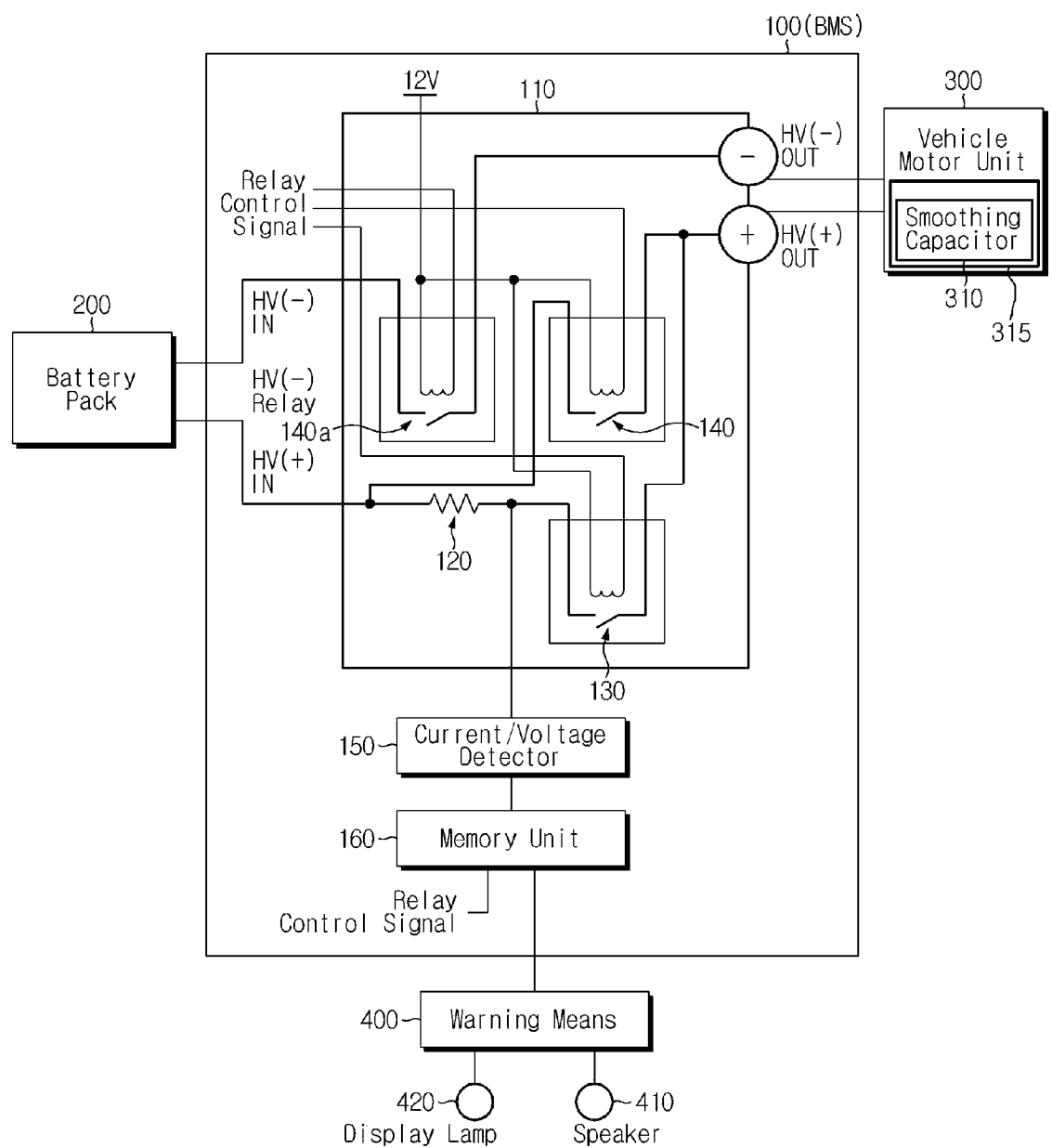
FIG. 4 is a block diagram of a battery pack connection circuit according to an embodiment of the invention.

FIG. 3 is a flow chart showing a battery pack management method for HEV and EV according to an embodiment of the invention, and FIG. 4 is a block diagram of a battery pack connection circuit according to an embodiment of the invention.

Hereinafter, a management method of a battery pack 200 for HEV and EV, will be described in further detail with reference to FIGS. 3 and 4.

First, when a vehicle is started, power for a relay control signal is applied to relays 130, 140, 140a of a battery pack connection circuit 110 through a battery management system (BMS) 100 or vehicle control device (S300).

Then, current or voltage is detected from a pre-charge resistor 120 of the battery pack connection circuit 110 using a current/voltage detector 150 of the BMS 100 (S305).

Subsequently, the detected current or voltage is compared with standard correspondence information pre-stored in a memory unit 160 of the BMS 100 (S310). Then, it is determined whether the detected value is within a normal range of the battery pack 200 (S315).

When the detected value is within the normal range as a result of the determination, a normal charging operation is carried out (S325), otherwise the pre-charge relay 130 of the battery pack connection circuit 110 is turned off (S335) and then a warning signal is provided to a driver through warning means 400 electrically connected to the BMS 100 (S350).

It is preferred that the comparison result of the measured value resulting from the determination step (S315) and the standard correspondence information is stored in the memory unit 160 (S320, S330).

In addition, the step of turning off the pre-charge relay 130 (S335) is preferably carried out under state that a relay detection signal detected from the pre-charge relay 130 stands by.

When the pre-charge relay 130 is turned off, the over-current or over-voltage applied to a vehicle motor unit 300 of the vehicle from the pre-charge relay 130 is interrupted, so that a smoothing capacitor 310 in the vehicle motor unit 300 is safely protected from the over-current or over-voltage.

In the mean time, the warning means 400 may be a display lamp 420 or speaker 410 and the display lamp 420 is preferably provided to a dashboard of the vehicle.

Continuously, when the pre-charge relay 130 is turned off, the number of cases where the pre-charge relay 130 is turned off is accumulated in the memory unit 160 (S340).

Then, it is determined whether the accumulated number of cases where the pre-charge relay 130 is turned off is within the number of cases where the pre-charge relay 130 is allowed to be turned off, which is preset in the memory unit 160 (S345).

When the accumulated off number of times is within the allowed off number of times as a result of the determination, the warning signal is provided to the driver through the warning means 400 (S350). In the mean time, when the accumulated off number of times exceeds the allowed off number of times, the operation of the battery pack 200 is interrupted (S335).

As described above, according to the invention, when the surge current is applied to the power conversion circuit 315 of the vehicle motor unit 300 from the battery pack 200 in starting the vehicle, a smoothing capacitor 310 or related devices of a power conversion circuit 315 is prevented from being damaged in advance through the battery pack connection circuit 110 arranged between the battery pack 200 and the power conversion circuit 315 of the vehicle motor unit 300.

In addition, when the over-current flows to the pre-charge resistor 120 of the battery pack connection circuit 110 or the pre-charge relay 130 of the battery pack connection circuit 110 is turned off due to the over-current or over-voltage during the driving, a diagnosis result is notified to the driver through the warning means 400, thereby contributing to a safety drive of the vehicle.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A battery pack management method for a hybrid electric vehicle (HEV) or an electric vehicle (EV), the method comprising steps of:
   applying power for a control signal to a relay of a battery pack connection circuit disposed between a battery pack and a power conversion circuit of a vehicle motor unit through a battery management system (BMS) or vehicle control device;
   detecting current or voltage from a pre-charge resistor of the battery pack connection circuit when starting the vehicle;
   comparing the detected current or voltage with standard correspondence information pre-stored in a memory unit of the BMS to determine whether the detected value is within a normal range of a battery pack; and
   carrying out connecting the battery pack and the power conversion circuit when the detected value is within the normal range as a result of the determination, otherwise turning off a pre-charge relay of the battery pack connection circuit and then providing a driver with a warning signal through warning means electrically connected to the BMS.

2. The method according to claim 1, wherein a comparison result of the measured value resulting from the determination step and the standard correspondence information is stored in the memory unit.

3. The method according to claim 1, wherein the step of turning off the pre-charge relay is carried out under state that a relay detection signal detected from the pre-charge relay stands by.

4. The method according to claim 1, wherein in the step of turning off the pre-charge relay, when the pre-charge relay is turned off, over-current or over-voltage applied to a motor unit of a vehicle from the pre-charge relay is interrupted, so that damage to a smoothing capacitor in the motor unit is prevented.

5. The method according to claim 1, wherein the warning means is a display lamp or speaker.

6. The method according to claim 5, wherein the display lamp is provided to a dashboard of the vehicle.

7. The method according to claim 1, further comprising a step of accumulating the number of cases where the pre-charge relay is turned off in the memory unit between the step of turning off the pre-charge relay and the step of providing the warning signal.

8. The method according to claim 7, further comprising determining whether the accumulated off number of times is within the number of cases where the pre-charge relay is allowed to be turned off, which is preset in the memory unit, after the accumulating step.

9. The method according to claim 8, wherein when the accumulated off number of times is within the allowed off number of times as a result of the determination, the warning signal is provided to the driver through the warning means.

10. The method according to claim 8, further comprising a step of interrupting an operation of the battery pack when the accumulated off number of times exceeds the allowed off number of times as a result of the determination.

* * * * *